US012022273B2

(12) United States Patent
Liu et al.

(10) Patent No.: US 12,022,273 B2
(45) Date of Patent: Jun. 25, 2024

(54) TRANSDUCER VIBRATION SUSPENSION SYSTEM FOR TRANSDUCER FOR IMPROVING THE ELECTRICAL-MECHANICAL CONVERSION EFFICIENCY OF AN ELECTRONIC DEVICE

(71) Applicant: GOERTEK INC., Shandong (CN)

(72) Inventors: Chunfa Liu, Shandong (CN); Fenglei Zu, Shandong (CN); Xinfeng Yang, Shandong (CN)

(73) Assignee: GOERTEK INC., Weifang (CN)

( * ) Notice: Subject to any disclaimer, the term of this patent is extended or adjusted under 35 U.S.C. 154(b) by 218 days.

(21) Appl. No.: 17/625,654

(22) PCT Filed: Aug. 13, 2019

(86) PCT No.: PCT/CN2019/100299

§ 371 (c)(1),
(2) Date: Jan. 7, 2022

(87) PCT Pub. No.: WO2021/003796

PCT Pub. Date: Jan. 14, 2021

(65) Prior Publication Data

US 2022/0279280 A1 Sep. 1, 2022

(30) Foreign Application Priority Data

Jul. 8, 2019 (CN) ......................... 201910612019.4

(51) Int. Cl.
*H04R 9/06* (2006.01)
*H04R 9/02* (2006.01)
*H04R 9/04* (2006.01)

(52) U.S. Cl.
CPC ............... *H04R 9/06* (2013.01); *H04R 9/025* (2013.01); *H04R 9/045* (2013.01)

(58) Field of Classification Search
CPC .......... H04R 9/06; H04R 9/025; H04R 9/045; H04R 7/06; H04R 9/02; H04R 2400/11
See application file for complete search history.

(56) References Cited

U.S. PATENT DOCUMENTS 5,953,437 A * 9/1999 Imahori ................ H04R 13/00 381/412
6,373,959 B1 4/2002 Masuda et al.
(Continued)

FOREIGN PATENT DOCUMENTS

CN 1350766 A 5/2002
CN 1159951 C 7/2004
(Continued)

OTHER PUBLICATIONS

International Search Report from International Application No. PCT/CN2019/100299 dated Mar. 26, 2020.

*Primary Examiner* — Angelica M McKinney
(74) *Attorney, Agent, or Firm* — Shih IP Law Group, PLLC

(57) ABSTRACT

The present disclosure discloses a vibration suspension system for a transducer, which comprises at least one movable device provided with a magnetic conductive material, at least a part of the magnetic conductive material being arranged in an area where an alternating magnetic field overlaps with a static magnetic field, so that the static magnetic field and the alternating magnetic field are converged, and a magnetic field force generated by the interaction between the static magnetic field and the alternating magnetic field being applied to the magnetic conductive material, so as to drive the vibration suspension system to move; and at least one suspension device comprising an elastic recovery device for providing a restoring force for a reciprocal vibration of the vibration suspension system, one
(Continued)

end of the elastic recovery device being fix to the movable device and the other end thereof being fixed to the inside of the transducer.

10 Claims, 3 Drawing Sheets

(56) References Cited

U.S. PATENT DOCUMENTS

| | | | | |
|---|---|---|---|---|
| 6,658,133 | B1 | 12/2003 | Usuki et al. | |
| 8,385,583 | B2 | 2/2013 | Thompson | |
| 9,668,058 | B2 * | 5/2017 | Matsumura | H04R 7/18 |
| 9,832,557 | B2 | 11/2017 | Park et al. | |
| 11,758,331 | B2 * | 9/2023 | Pan | H04R 11/02<br>381/412 |
| 2002/0021819 | A1 | 2/2002 | Masuda et al. | |
| 2010/0054509 | A1 | 3/2010 | Thompson | |
| 2016/0173990 | A1 | 6/2016 | Park et al. | |
| 2020/0059728 | A1 * | 2/2020 | Ding | H04R 1/2834 |

FOREIGN PATENT DOCUMENTS

| | | | | | |
|---|---|---|---|---|---|
| CN | 102187689 | A | | 9/2011 | |
| CN | 103037294 | A | | 4/2013 | |
| CN | 103491478 | A | | 1/2014 | |
| CN | 105704625 | A | | 6/2016 | |
| CN | 108462924 | A | | 8/2018 | |
| CN | 105704625 | B | | 4/2019 | |
| CN | 110012398 | A | | 7/2019 | |
| DE | 60009692 | | | 5/2004 | |
| EP | 1179285 | A2 | | 2/2002 | |
| EP | 1179285 | B1 | | 4/2004 | |
| EP | 2329657 | A2 | | 6/2011 | |
| EP | 2329657 | A4 | | 10/2011 | |
| EP | 3035708 | A2 | | 6/2016 | |
| EP | 3035708 | A3 | | 9/2016 | |
| JP | 2001231097 | A | | 8/2001 | |
| JP | 2002058095 | A | | 2/2002 | |
| JP | 3412813 | B2 | | 6/2003 | |
| JP | 2012501609 | A | | 1/2012 | |
| KR | 20110063792 | A | | 6/2011 | |
| KR | 20150056227 | A | * | 5/2015 | H04R 9/045 |
| TW | 472494 | B | | 1/2002 | |
| WO | 0070905 | A2 | | 11/2000 | |
| WO | 0070905 | A3 | | 3/2001 | |
| WO | 2010025351 | A2 | | 3/2010 | |
| WO | 2010025351 | A8 | | 4/2010 | |
| WO | 2010025351 | A3 | | 6/2010 | |
| WO | 2013044550 | A1 | | 4/2013 | |
| WO | 2020228229 | A1 | | 11/2020 | |

* cited by examiner

TRANSDUCER VIBRATION SUSPENSION SYSTEM FOR TRANSDUCER FOR IMPROVING THE ELECTRICAL-MECHANICAL CONVERSION EFFICIENCY OF AN ELECTRONIC DEVICE

TECHNICAL FIELD

The present disclosure relates to a vibration suspension system for a transducer, and a transducer and an electronic device including the same.

BACKGROUND ART

Transducers are very important and widely used energy conversion devices. For example, in the field of consumer electronics, transducers are core components of various consumer electronic products such as mobile phones, tablet computers, laptops and audios, and for various transducers, the design of suspension systems has a significant influence on the performance and structural design thereof. There are mainly two working principles of the transducer suspension system in existing technology:

I. Moving-coil type: as an example, in a moving-coil loudspeaker illustrated in FIGS. 1 and 2, the suspension system is composed of a diaphragm 2' and a coil 4', the coil 4' is located in a static magnetic field, an alternating current is supplied to the coil 4', and the coil 4' may be subjected to an alternating Ampere force to drive the suspension system to vibrate, thereby realizing a conversion from alternating electrical signal to reciprocal mechanical motion.

However, it has the following disadvantages:

1. The increase of magnetic flux density in specific areas in the loudspeaker is limited, and the complex magnetic circuit design result in an increase of cost and process difficulty;
2. With using time increases, impurities are easily to be absorbed in small gaps between magnets, and if some movable magnetic liquid is added in the loudspeaker to increase the magnetic flux density in specific areas, the characteristics of the movable magnetic fluid will also age and decay in a long-time working state, thus affecting the consistency of coil performance;
3. The coil have to be connected with an electrical signal driver through a lead-out device, the lead-out device has process defects in vibration intensity, installation firmness and system connection strength, so that a movable component installed with the coil is largely limited in reliability and firmness.

II. Moving-iron type: As illustrated in FIGS. 3 and 4, the system is composed of a diaphragm 2', a thimble 8, a coil 4' and a transmission mechanism 9. The suspension system uses U-shaped iron or T-shaped iron fixed at one end and the transmission mechanism 9 to drive the diaphragm 2'. The working principle of the system is described as follows: the alternating magnetic field generated by the coil 4' is guided and converged by a magnetic conductive material; through a special structural design, such as U-shaped iron or T-shaped iron, the alternating magnetic field generated by the alternating current is converged in the magnetic conductive material, one end of the U-shaped iron or T-shaped iron is located in a static magnetic field with a orthogonal component thereto, the static magnetic field generates a force at the one end, thereby causing a local deformation of the U-shaped iron or T-shaped iron; the elastic suspension system is a diaphragm, and the U-shaped iron or T-shaped iron communicates with the diaphragm through the transmission mechanism 9, so as to realize the conversion from alternating electrical signal to reciprocal mechanical motion.

However, this design has the following disadvantages:

1. The deformed portion of the U-shaped iron or T-shaped iron is used as a driving component, a coupling mechanism for the transmission of mechanical motion needs to be provided, the armature line is too long, and the magnetic field attenuates greatly along its path, and there will be a large magnetic leakage at its bending area (clamping area), resulting in a rapid decline of driving performance;
2. The magnetic conductive material is used as a structural component as well as a magnetic conductive material, thus there are limitations on material selection, for example, a silicon steel/permalloy material has good magnetic conductivity but is difficult in molding, while a material with good molding condition has a magnetic conductivity not as good as that of silicon steel/permalloy; and
3. In order to maintain the equilibrium position of the magnetic converging end of the U-shaped iron or T-shaped iron in the static magnetic field, it is generally necessary to repeatedly magnetize and calibrate the components that generate the static magnetic field, and thus on the one hand, the magnetic energy product of permanent magnets is not fully used, and on the other hand, it also brings great difficulty to manufacturing.

Therefore, it is necessary to improve the vibration suspension system of the transducer in the prior art to avoid the above-mentioned disadvantages.

SUMMARY

In order to solve the above technical problems, according to an aspect of the present disclosure, there is provided a vibration suspension system for a transducer, the vibration suspension system including:

at least one movable device provided with a magnetic conductive material, at least a part of the magnetic conductive material is arranged in an area where an alternating magnetic field overlaps with a static magnetic field, so that the static magnetic field and the alternating magnetic field are converged; a magnetic field force generated by the interaction between the static magnetic field and the alternating magnetic field is applied to the magnetic conductive material so as to drive the vibration suspension system to move; and at least one suspension device, the suspension device includes an elastic recovery device for providing a restoring force for a reciprocal vibration of the vibration suspension system; one end of the elastic recovery device is fixed to the movable device, and the other end thereof is fixed to an inside the transducer.

As an improvement, the alternating magnetic field is a magnetic field generated by a coil with an alternating current passing therethrough, and the coil and the magnetic conductive material are arranged in a horizontal direction.

As an improvement, the static magnetic field is a magnetic field generated by a permanent magnet, the static magnetic field is arranged on at least one side of the magnetic conductive material along a vertical direction, and the static magnetic field is orthogonal or partially orthogonal to the alternating magnetic field.

As an improvement, the magnetic conductive material has a plate structure.

As an improvement, magnetic conductive material is provided in two sets, and two alternating magnetic fields and two static magnetic fields are correspondingly provided in the transducer.

As an improvement, the transducer is a magnetic potential loudspeaker, the vibration suspension system further includes a diaphragm, the diaphragm isolates front and rear cavities of the loudspeaker, the magnetic conductive material is fixed to a surface of the diaphragm, and the diaphragm constitutes a part of the elastic recovery device.

As an improvement, the magnetic conductive material has a sheet shape and is provided as a plurality of magnetic conductive members, and the plurality of magnetic conductive members are symmetrically provided on both surfaces of the diaphragm.

As an improvement, there are one or more sets of magnetic conductive material, and each set of the magnetic conductive material is arranged on the surfaces of the diaphragm.

According to another aspect of the present disclosure, there is provided a transducer including the vibration suspension system described above.

The vibration suspension system for a transducer and transducer proposed by the present disclosure has obvious technical advantages in terms of performance, assembly process, etc.

Firstly, the core components are a set of magnetic conductive material that may be alternately polarized by the coil surrounding it. The magnetic conductive material as a whole is a part of the movable component, and the alternating magnetic pole converged by the magnetic conductive material is located in a static magnetic field orthogonal or partially orthogonal to the alternating magnetic field, the he static magnetic field and the alternating magnetic field may apply forces on the magnetic conductivity material, thereby causing the magnetic conductive material and other movable components to reciprocal motion, and realizing the conversion from alternating electrical signal to reciprocal mechanical motion. The present disclosure solves the problem of an insufficient driving force in a traditional transducer, and improving the electrical-mechanical conversion efficiency in full-band of the transducer.

Secondly, compared with prior art, in the vibration suspension system according to the present disclosure, the magnetic circuit structure for forming the magnetic field is simple in terms of design, the magnetic energy product of the permanent magnet may be fully utilized, and it is unnecessary to consider the performance requirements on the magnetic conductive material as a structural member and a magnetic conductive member at the same time, and thus the material selection can be more flexible.

Thirdly, the transducer according to the present disclosure is mainly composed of a magnetic conductive material, two interacting magnetic fields and a suspension device, the assembly process between the components is simple, and it is beneficial to improve the firmness after combination, and the product reliability is good.

According to another aspect of the present disclosure, an electronic device including the vibration suspension system for a transducer is provide.

Other features and advantages of the present disclosure will be apparent from the following detailed description of exemplary embodiments of the present disclosure with reference to the accompanying drawings.

BRIEF DESCRIPTION OF THE DRAWINGS

The drawings, which are incorporated in the specification and constitute a part of the specification, show embodiments of the present disclosure, and are used to explain the principle of the present disclosure together with the description. In the drawings.

REFERENCE NUMERALS

Figure 1:
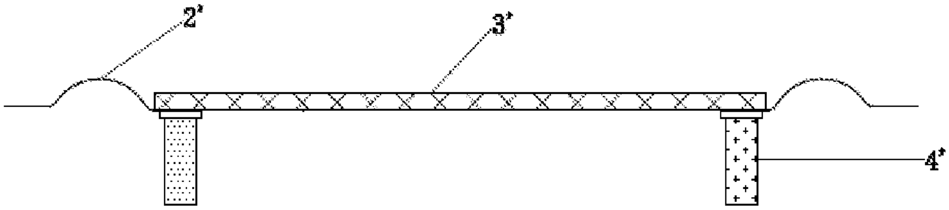
Fig 1 (Prior Art)
FIG. 1 is a schematic cross-sectional view of a vibration suspension system of a moving-coil loudspeaker in the prior art.
Figure 2:
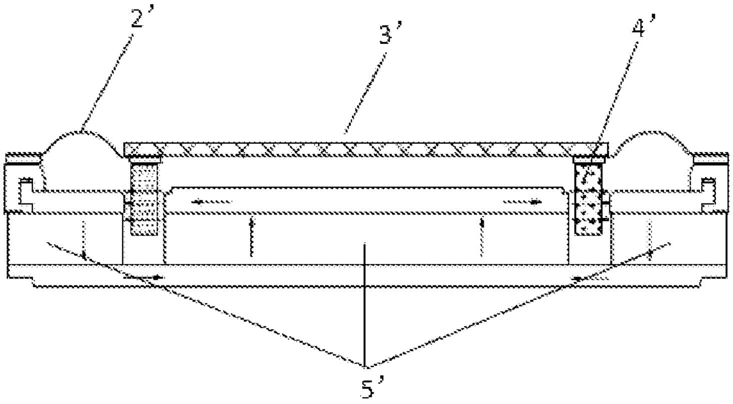
Fig 2 (Prior Art)
FIG. 2 is a schematic diagram of the overall structure of the moving-coil loudspeaker in the prior art.
Figure 3:
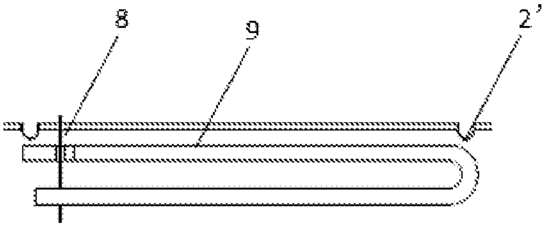
Fig 3 (Prior Art)
FIG. 3 is a schematic cross-sectional view of a vibration suspension system of a moving-iron loudspeaker in the prior art.
Figure 4:
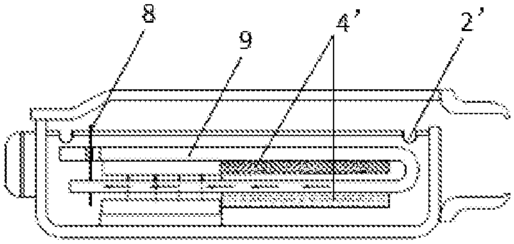
Fig 4 (Prior Art)
FIG. 4 is a schematic diagram of the overall structure of the moving-iron loudspeaker in the prior art.

1: magnetic conductive material; 11: first set of magnetic conductive material; 12: second set of magnetic conductive material; 2: diaphragm; 2': diaphragm; 3: reinforcement member; 3': reinforcement member; 4: coil; 4': coil; 41: first coil; 42: second coil; 5: permanent magnets; 5': permanent magnets; 51: first permanent magnet; 52: second permanent magnet; 6: suspension device; 7: bracket; 8: thimble; 9: transmission mechanism; A: static magnetic field; B: alternating magnetic field.

DETAILED DESCRIPTION OF THE EMBODIMENTS

Various exemplary embodiments of the present disclosure will now be described in detail with reference to the accompanying drawings. It should be noted that unless specifically stated otherwise, the relative arrangement, numerical expressions and numerical values of the components and steps set forth in the embodiments do not limit the scope of the present disclosure.

The following description of at least one exemplary embodiment is merely illustrative in fact and is in no way intended to be used as any limitation to the present disclosure and its application or use.

The technologies, methods and devices known to those of ordinary skill in the relevant field may not be discussed in detail, but where appropriate, the technologies, methods and devices shall be regarded as a part of the specification.

In all examples shown and discussed herein, any specific value should be construed as merely exemplary and not as a limitation. Therefore, other examples of the exemplary embodiments may have different values.

It should be noted that similar reference numerals and letters refer to similar items in the following drawings. Therefore, once an item is defined in one drawing, it does not need to be further discussed in subsequent drawings.

The present disclosure provides a vibration suspension system for a transducer, which includes: at least one movable device provided with a magnetic conductive material, at least a part of the magnetic conductive material being arranged in an area where an alternating magnetic field overlaps with a static magnetic field, the magnetic conductive material converging the magnetic field in the area where the static magnetic field overlaps with the alternating magnetic field, a magnetic field force generated by the interaction between the static magnetic field and the alternating magnetic field being applied to the magnetic conductive material, so as to drive the vibration suspension system to move; and at least one suspension device comprising an elastic recovery device for providing a restoring force for a reciprocal vibration of the vibration suspension system, one end of the elastic recovery device being fix to the movable device and the other end thereof being fixed to an inside of the transducer.

Specifically, it will be described in detail with reference to specific embodiments of the present disclosure.

EMBODIMENTS

Figure 5:
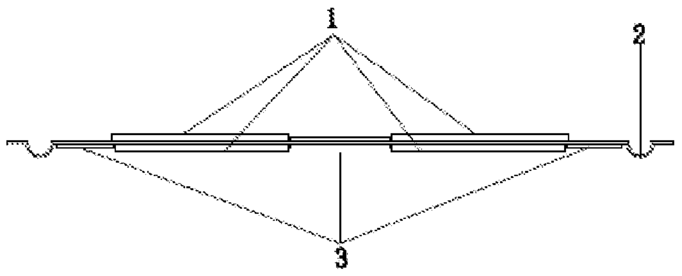
FIG. 5 is a schematic cross-sectional view of a movable device of a transducer according to an embodiment of the present disclosure.

FIG. 5 illustrates a movable device of the vibration suspension system for a transducer of the embodiment. The movable device includes a magnetic conductive material 1, and the magnetic conductive material 1 itself has a magnetic converging function. The movable device further includes a diaphragm 2 connected with and fixed to the magnetic conductive material 1, the diaphragm 2 may reciprocally move under the driving of the magnetic conductive material 1. That is, the movable device may move as a whole.

In the embodiment, there are two sets of magnetic conductive material 1 marked as first set of magnetic conductive material 11 and second set of magnetic conductive material 12, each set of magnetic conductive material has two sheet-shaped magnetic conductive material, respectively, and both sets of the magnetic conductive material have a magnetic converging effect. More specifically, the first set of magnetic conductive material 11 and the second set of magnetic conductive material 12 are provided in parallel, and each includes two magnetic conductive members symmetrically arranged on upper and lower surfaces of the diaphragm 2, respectively. It should be noted that the specific forms and configurations of the magnetic conductive material 1 are not limited to the embodiment. For example, the magnetic conductive material may be provided as one or one set or more sets, which may be in the form of an independent magnetic conductivity metal member, or may be a magnetic conductive material formed by coating on the surface of the diaphragm, or other forms of magnetic conductivity members. In the case where multiple sets of magnetic conductive members are provided, the multiple sets of magnetic conductive members are preferably symmetrically provided on the two opposite surfaces of the diaphragm 2 in consideration of the balance of motion, driving force and other factors, and of course, they may also be staggered. The magnetic conductive material 1 may be in a sheet-like structure, a block-like structure, or other irregular structures. The above-mentioned number, structure, and the positions of the magnetic conductive material 1 are not limited to the structure as illustrated in the embodiment.

The diaphragm 2 of the movable device may be a material with certain flexibility, a central portion thereof is combined with the magnetic conductive material 1, and a portion around the central portion may be an upwardly convex arc structure as shown in the drawing or a downwardly concave arc structure. In addition, an edge portion arranged on the outside of the arc structure may be further included. The diaphragm 2 and the magnetic conductive material 1 move as a whole. In order to improve the phenomenon of split vibration, it is preferable to provide a reinforcement member 3 in the central portion of the diaphragm 2, and the reinforcement member 3 is generally formed with a material having high rigidity. As illustrated in FIG. 5, the reinforcement member 3 may be provided at an edge of the central portion close to the arc structure, and of course, the reinforcement member 3 may be arranged at other positions, which is also applicable to the embodiment.

The working principle of the movable device will be described below with reference to FIG. 6. It should be understood that in the working process of the transducer, the motion of the movable device is relay on a driving module, and the driving module in the embodiment includes an external magnetic field and a magnetic conductive material 1. The external magnetic field specifically includes a static magnetic field A and an alternating magnetic field B. Of course, the "external" in the external magnetic field is named in a perspective of the vibration suspension system, which refers to a magnetic field generated from a member outside the vibration suspension system, and should not be construed as a magnetic field outside the transducer device.

Preferably, the static magnetic field A is a static magnetic field generated by a permanent magnet 5, and the static magnetic field is arranged in a vertical direction. The alternating magnetic field B is an alternating magnetic field generated by a coil 4, which is an alternating magnetic field generating device, through input of an alternating current signal, and the magnetic field is arranged in a horizontal direction and is orthogonal (or partially orthogonal in specific implementation) to the static magnetic field A. The magnetic conductive material 1 is arranged in the horizontal direction, and is arranged in an area where the static magnetic field A overlaps with the alternating magnetic field B. In other words, at least a part of the magnetic conductive material 1 may be located in the overlapping area of the two magnetic fields, and performs a magnetic converging function in the area.

In an ideal state, when the alternating magnetic field generating device, i.e., the coil 4 is not energized, i.e., when the alternating magnetic field has not been generated, the magnetic conductive material 1 itself will be affected by a static magnetic force of the static magnetic field A, and the static magnetic force appears to be equal in magnitude and opposite in direction on both sides of the magnetic conductive material 1, thus the overall force of the static magnetic force is 0, and thus the magnetic conductive material 1 may be maintained in an equilibrium position. In other cases, the static magnetic force applied by the static magnetic field A on the magnetic conductive material 1 is not 0, the magnetic conductive material 1 has a tendency to deviate from the equilibrium position, but an elastic restoring force can be provided due to an elastic recovery device to keep the magnetic conductive material 1 in the original equilibrium position. The elastic recovery device will be described in detail below with reference to FIG. 7. Here, the interaction between the magnetic field and the magnetic conductive material 1 is explained mainly in combination with FIG. 6.

When the alternating magnetic field B is generated, the magnetic conductive material 1 is located in the area where the static magnetic field A overlaps with the alternating magnetic field B, the magnetic conductive material 1 converges the magnetic field in the area, and an interaction force will be generated between the alternating magnetic field B and the static magnetic field A and applied to the magnetic conductive material, so that the magnetic conductive material 1 drives the movable component C to vibrate.

Specifically, in the embodiment, two coils 4, i.e., first coil 41 and second coil 42, are provided. Correspondingly, two permanent magnets 5, i.e., first permanent magnet 51 and second permanent magnet 52 are provided. The first permanent magnet 51 and the second permanent magnet 52 are arranged opposite to each other on both sides of the magnetic conductive material 1. That is, the first permanent magnet 51 may be provided on the upper side of the magnetic conductive material 1 and the second permanent magnet 52 may be correspondingly provided on the lower side of the magnetic conductive material 1.

In the embodiment, the magnetic conductive material 1 as a driving source drives the vibration device to vibrate. An end of the first set of magnetic conductive material 11 is located in the static magnetic field A generated by the first coil 41, and at least one portion of the first set of magnetic conductive material 11 is simultaneously located in the alternating magnetic fields B generated by the first permanent magnet 51 and the second permanent magnet 52. Likewise, an end of the second set of magnetic conductive material 12 is located in the static magnetic field A generated by the second coil 42, and at least one portion of the second set of magnetic conductive material 12 is simultaneously located in the alternating magnetic fields B generated by the first permanent magnet 51 and the second permanent magnet 52.

Figure 6:
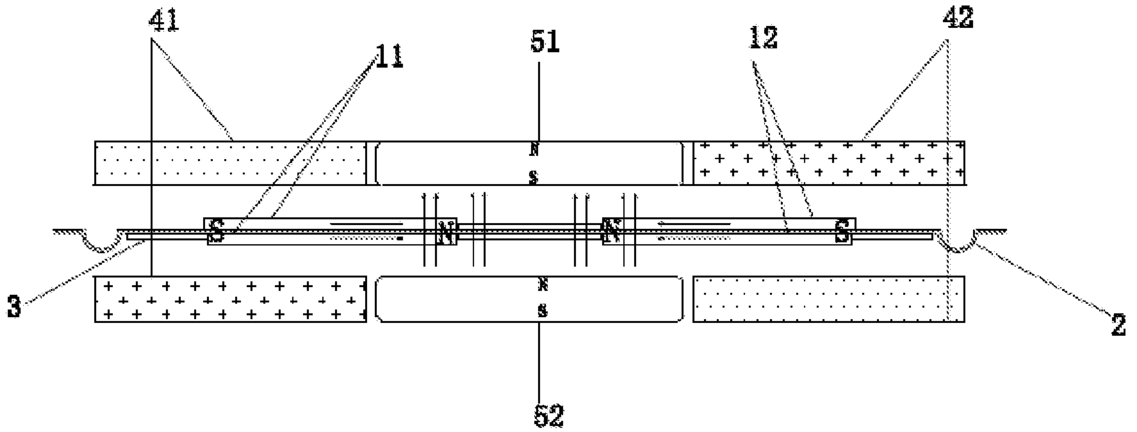
FIG. 6 is a schematic cross-sectional view of a movable device and a fixed component of the transducer according to an embodiment of the present disclosure.

As illustrated in FIG. 6, the magnetic poles of the opposite ends of the first permanent magnet 51 and the second permanent magnet 52 are opposite. In the embodiment, assumed that the magnetic poles of the opposite ends of the first permanent magnet 51 and the second permanent magnet 52 are an S pole and an N pole respectively, and the magnetic poles of the two ends away from each other are an N pole and an S pole respectively. Likewise, alternating current signals in opposite directions are input to the first coil 41 and the second coil, where "+" means that the current direction is perpendicular to the paper surface inward, "•" means that the current direction is perpendicular to the paper surface outward. The first set of magnetic conductive material 11 is polarized in the alternating magnetic field generated by the first coil 41, and the second set of magnetic conductive material 12 is polarized in the alternating magnetic field B generated by the second coil 42. According to the right-hand rule, the magnetic poles of adjacent ends of the first set of magnetic conductive material 11 and the second set of magnetic conductive material 12 are N poles, and the magnetic poles of the two ends away from each other of the first set of magnetic conductive material 11 and the second set of magnetic conductive material 12 are S poles. The arrows in FIG. 6 respectively show the direction of the magnetic induction line inside the magnetic conductive material 1 after polarization and the direction of the magnetic induction line of the alternating magnetic field B. Taking the first set of magnetic conductive material 11 as an example, one end thereof is an N pole, one end of the first permanent magnet 51 is an S pole and is close to the N pole of the first set of magnetic conductive material 11, and one end of the second permanent magnet 52 is an N pole and is close to the N pole of the first set of magnetic conductive material 11. So, the first set of magnetic conductive material 11 may be respectively subjected to the attraction and repulsion of the static magnetic field of first permanent magnet 51 and the second permanent magnet 52, and the two forces are in the same direction. Likewise, the second set of magnetic conductive material 12 may also be subjected to the same attraction and repulsion of the static magnetic field of first permanent magnet 51 and the second permanent magnet 52. Meanwhile, under the action of a suspension device 6 (described in detail later in conjunction with FIG. 7), the magnetic conductive material 1 may reciprocally move under the driving of the alternating magnetic field B and the static magnetic field A.

That is, in such a vibration suspension system, the magnetic conductive material 1 itself participates in the vibration as a whole based on its own magnetic converging effect and the interaction force of two external magnetic fields correspondingly provided, thus it can be used as a driving source driving the motion of the vibration suspension system, and may also be a part of the movable device.

As mentioned above, when the magnetic conductive material 1 moves away from the equilibrium position, it will drive the diaphragm 2 coupled thereto to vibrate together.

Of course, the embodiment illustrates is only an example. The directions of the magnetic induction lines of the alternating magnetic field B and the static magnetic field A are not limited to the directions shown in the drawings. For example, the magnetic poles of the opposite ends of the first permanent magnet 51 and the second permanent magnet 52 may be opposite to those shown in the drawings. In addition, the current directions of the first coil 41 and the second coil 42 may also be opposite to those shown in the drawings. Accordingly, the polarities of the adjacent ends and the ends away from each other after polarization of the two sets of magnetic conductive material may be opposite, but corresponding attraction and repulsion forces will also be generated and the reciprocal motion will also be realized through the alternating magnetic field and the static magnetic field.

For the vibration suspension system, the core components are a set of magnetic conductive material that may be alternately polarized by the coil surrounding it. The magnetic conductive material as a whole is a part of the movable component, and the alternating magnetic pole converged by the magnetic conductive material is located in a static magnetic field orthogonal or partially orthogonal to the alternating magnetic field, the he static magnetic field and the alternating magnetic field may apply forces on the magnetic conductivity material, thereby causing the magnetic conductive material and other movable components to reciprocal motion, and realizing the conversion from alternating electrical signal to reciprocal mechanical motion. The present disclosure solves the problem of an insufficient driving force in a traditional transducer, and improving the electrical-mechanical conversion efficiency in full-band of the transducer. In addition, the vibration suspension system has a firm structure and a simple assembly process.

Figure 7:
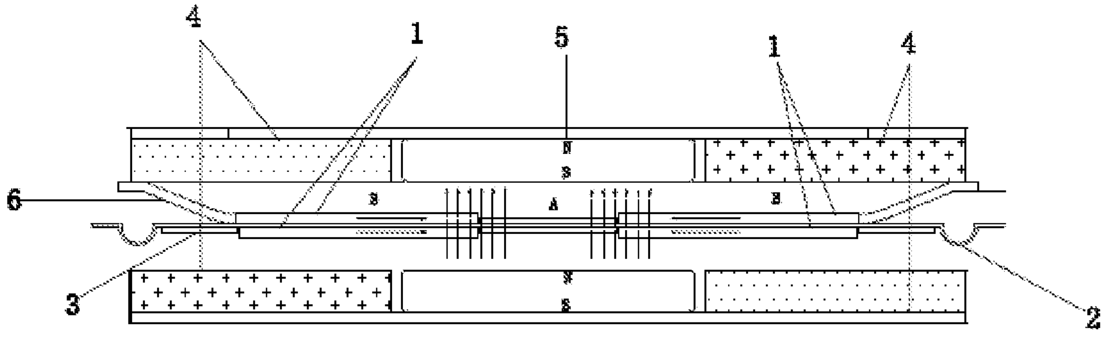
FIG. 7 is a schematic cross-sectional view of a vibration suspension system for a transducer according to an embodiment of the present disclosure.

Continuing to refer to FIG. 7, the vibration suspension system further includes a suspension device 6. The main function of the suspension device 6 is to provide an elastic restoring force to the movable device when the device moves.

As mentioned in the Background Art, in the micro-transducer in the field of consumer electronics, efforts made to improve the driving force or reduce a first-order resonance frequency to improve the low-frequency performance may causing anti-stiffness in the magnetic circuit. For convenience of explanation, the concepts of the first-order resonant frequency and the anti-stiffness will be explained hereinafter. The first-order resonant frequency refers to a resonant frequency in the first-order mode. The anti-stiffness which is also referred to as magnetic stiffness, refers to, when the magnetic conductive material (including soft and hard magnetic materials) approaches an area with high magnetic flux density, a force applied on it gradually increases and is in a direction in which it moves, the ratio of variation of the force to the displacement is referred to as the anti-stiffness of the magnetic conductive material.

For a micro-transducer, a general design principle is meeting the requirements for driving force is a first priority, which may result in excessive anti-stiffness. In order to solve this technical problem, a suspension device 6 is further provided to reduce the excessive anti-stiffness. In the embodiment, specifically, the suspension device 6 includes an elastic recovery device, one end of the elastic recovery device is fixed to the vibration suspension system, and the other end thereof is fixed to the inside of the transducer. When the vibration suspension system reciprocally moves, the device may provide an elastic force to restore it to the equilibrium position. Specifically, the suspension device 6 selected from a leaf spring with an elastic bar, a spring, or other elastic components, may be provided as an independent ring-shaped component, or may be provided as one or more groups of separated components, as long as it is made of elastic materials to provide elastic force, and one end thereof is fixed to the vibration suspension system and the other end thereof is fixed to the inside of the transducer.

In the embodiment, as illustrated in FIG. 7, the leaf spring has a first fixing end connected to the transducer and a second fixing end connected to the magnetic conductive material 1, and there is a height difference between the first fixing end and the second fixing end in a vibration direction of the vibration suspension system, thus the leaf spring may provide an elastic restoring force due to an elastic deformation in the vibration direction.

Based on the above description, in the embodiment, the leaf spring, used as the suspension device 6, provides the elastic restoring force for the reciprocal motion of the movable component. Further, the edge portion of the diaphragm 2 actually functioned as a part of the elastic recovery device as well.

In the structure of the embodiment, the force balance device is composed of an anti-stiffness balance device and a movable device (including the diaphragm 2 and the magnetic conductivity material 1), and the following factors may be considered when determining the specific configurations thereof:

1) The anti-stiffness of the micro-transducer is measured through simulation or experiment. If the anti-stiffness is non-linear, it is necessary to measure a curve of the static magnetic field force received by the movable device varying with respect to its displacement through simulation or measurement; and
2) Obtain the stiffness requirements of the force balance device according to the design requirements for the first-order resonant frequency and the measurement results of the anti-stiffness. Design at least one anti-stiffness balance device, which may have various forms, such as the aforementioned leaf spring, spring, magnetic spring, etc., according to the requirements and the internal spatial structure of the micro-transducer.

In addition to the above factors, the design of the anti-stiffness balance device shall follow its own requirements: in the case of the leaf spring or springs, it is necessary that a stress generated when it is stretched or compressed to an ultimate displacement is less than the yield strength of the member; and in the case of the magnetic springs, it is necessary that when it is stretched or compressed to an ultimate displacement, it does not exceed the range of the magnetic field force thereof.

It can be seen that in the embodiment, in addition to the elastic recovery function of the diaphragm 2, the excessive anti-stiffness may be reduced by additionally providing an anti-stiffness balance device. Such design may bring the following advantages:

a) The stiffness of the force balance device is individually designed to reduce the anti-stiffness, and thus the driving force may be designed independently without considering the magnitude of anti-stiffness;
b) The stiffness of the force balance device is only dependent on its own structure, so that the total stiffness of the system may be adjusted by adjusting the stiffness, thereby indirectly adjusting the first-order resonant frequency of the system.

The total stiffness of the system is obtained by superposition of the anti-stiffness and stiffness of the suspension system, so that the total stiffness is always less than the stiffness of the vibration suspension system. Since the first-order resonant frequency of the micro-transducer is positively correlated with the total stiffness of the system, the first-order resonant frequency may be sufficiently reduced by adjusting the anti-stiffness of the system, thereby effectively improving the low-frequency performance of the micro-transducer.

Figure 8:
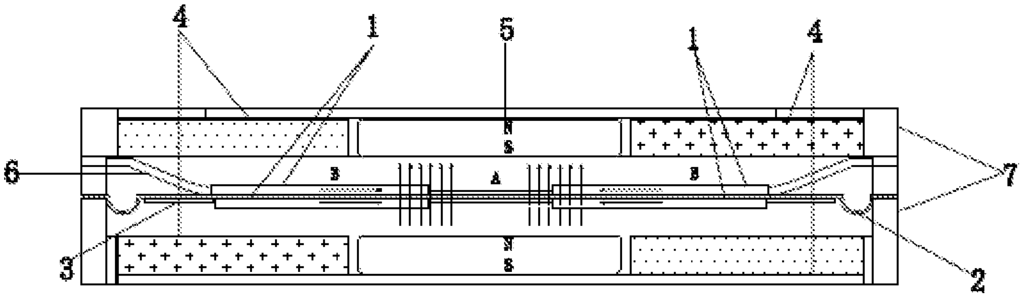
FIG. 8 is a schematic diagram of the overall structure of the transducer according to an embodiment of the present disclosure.

Further, as illustrated in FIG. 8, the transducer device further includes a bracket 7, which provides a peripheral frame of the transducer, and on which the edge portion of the diaphragm 2 is fixed, to isolate front and rear cavities of the transducer device. In a specific embodiment, the specific structure of the bracket 7 is not limited, and it may be a ring-shaped housing integrally formed and provided with an opening, or may be a housing assembly composed of a plurality of independent housing members connected and fixed to each other. For a loudspeaker, a sound hole is may be provided on the bracket 7, a sound wave generated by the vibration of a vibrator propagates to the outside through the sound hole, so as to realize a sound generation function.

The transducer according to the embodiment of the present disclosure is further illustrated in a perspective of the assembly of the transducer. As illustrated in FIGS. 7 and 8, the bracket 7 provides a peripheral frame, wherein each of the permanent magnet 5, the first coil 41 and the second coil 42 may be positioned in the frame provided by the bracket 7, and specifically, the first coil 41, the permanent magnet 5 and the second coil 42 are assembled sequentially from left to right in the horizontal direction. That is, the first coil 41 and the second coil 42 are respectively fix to both sides of the permanent magnet 5 and spaced apart from the permanent magnet 5 by a certain distance. After the two permanent magnets are installed correspondingly, a vibration space 20 is formed in the transducer, and the diaphragm 2, and the magnetic conductive material 1 that drives the diaphragm 2 are assembled in the vibration space. The magnetic conductive material 1 is connected to and fix to the surface of the diaphragm 2, and is spaced apart from the first permanent magnet 51 and the second permanent magnet 52 by a certain distance, so that a space for a reciprocal motion under the driving of the alternating magnetic field B and the static magnetic field A may be ensured. A first fixing portion of the anti-stiffness balance device is disposed on a wall of the bracket 7, and a second fixing portion is connected to the vibration suspension system to additionally provide an independent elastic restoring force.

As mentioned above, the magnetic conductive material 1 may move as a whole in the transducer. Herein, "move as a whole" means that the magnetic conductive material 1 is freely disposed on the suspension device 6 and its boundary is not clamped on other components, which is essentially different from the U-shaped or T-shaped armature structure of the moving-iron transducer described above. According to the present disclosure, problems usually occur in the moving-iron transducer, for example, the armature line is too long, the magnetic field attenuates greatly along its path, a large magnetic leakage occurs at its bending area (clamping area) and the driving performance is rapidly decreased, are avoid. Further, the product is not limited to the size. In the present disclosure, the magnetic conductive material 1 drives the movable component to vibrate through the interaction between the static magnetic field A and the alternating magnetic field B, and according to the principle of magnetomotive force balance, i.e., the total magnetic potential of the system remains remain unchanged within a certain range and the magnetic field is distributed in accordance with the principle of minimum potential energy of current and magnetic flux, and the driving force may be effectively improved according to the principle of magnetic potential while maintaining a lightweight of existing micro-transducers.

It should be noted that: 1) The magnetic conductive material 1 may have a flat sheet structure, may be provided as one piece, or two pieces, or may be provided as multiple sets, and the number of magnetizers provided for each set of magnetic conductive material is not limited. Also, the magnetic conductive material does not necessarily have to be constitute by independent magnetizers. For example, when the magnetic conductive material is connected to the diaphragm, it may be a magnetic conductive material covering a part of the surface of the diaphragm by coating on the surface of the diaphragm. 2) In order to reduce the vibration of the movable device, the magnetic conductive material is preferably symmetrically provided on both surfaces of the diaphragm 2, and of course, when there are multiple sets of magnetic conductive material, they may be staggered. 3) In specific implementations, the present disclosure may be applied not only to a square transducer, but also to a circular or other shaped transducer structure, and accordingly, the diaphragm may be square or circular or the like. 4) The number of static magnetic field generating device, alternating magnetic field generating device, movable device and suspension device in the magnetic potential transducer may be one or more, for example, when the permanent magnet that generates the static magnetic field consists of a plurality of magnet groups, the number of the permanent magnets provided on the upper side of the magnetic conductive material 1 is preferably equal to those on the lower side of the magnetic conductive material 1, and they are provided in one-to-one correspondence, which is benefit to the balance of the static magnetic field force. Of course, the design may be flexible according to specific requirements. 5) The present embodiment shows a magnetic potential loudspeaker structure, in which the magnetic conductive material 1 drives the diaphragm 2 to vibrate so as to generate sound waves to the outside. Of course, it may also be applied to structures such as a motor, and when used in a motor, it may further drive other vibration components (for example, balancing weight) to vibrate under the driving of the magnetic conductive material 1.

The vibration suspension system for a transducer of the present disclosure has excellent adaptability to products of different sizes and may be widely used in electronic devices. The micro-loudspeaker described in the embodiment are only preferred embodiments. The present disclosure may also be applied to motors or large speakers, and the application fields including motors, automotive electronics, audios, mobile phones, tablet computers and many other fields.

Although some specific embodiments of the present disclosure have been described in detail by way of example, those skilled in the art should understand that the above examples are only for illustration and are not intended to limit the scope of the present disclosure. Those skilled in the art should understand that the above embodiments can be modified without departing from the scope and spirit of the present disclosure. The scope of the present disclosure is defined by the appended claims.

What is claimed is:

1. A vibration suspension system for a transducer, the vibration suspension system comprising:

a movable device provided with a magnetic conductive material provided thereon a coil configured to generate an altering magnetic field;

a permanent magnet configured to generate a static magnetic field; and at least one suspension devices for providing a restoring force for a reciprocal vibration of the vibration suspension system, wherein one end of the suspension device is fixed to the movable device, and the other end thereof is fixed to an inside of the transducer, wherein a first end of the magnetic conductive material is located in a position corresponding to the alternating magnetic field in a vertical direction, and a second end opposite to the first end of the magnetic conductive material is located at a position corresponding to the static magnetic field in the vertical direction, wherein the permanent magnet is disposed at a position corresponding to a center portion of the movable device, and the coil is disposed tat a position corresponding to an edge portion of the movable device.

2. The vibration suspension system of claim 1, wherein the coil and the magnetic conductive material are arranged in a horizontal direction.

3. The vibration suspension system of claim 1, wherein the static magnetic field is arranged on at least one side of the magnetic conductive material in a vertical direction, and the static magnetic field is orthogonal or partially orthogonal to the alternating magnetic field.

4. The vibration suspension system of claim 1, wherein the magnetic conductive material has a plate structure.

5. The vibration suspension system of claim 4, wherein, magnetic conductive material is provided in two sets, and two alternating magnetic fields and two static magnetic fields are correspondingly provided in the transducer.

6. The vibration suspension system of claim 1, wherein the transducer is a magnetic potential loudspeaker, the vibration suspension system further comprises a diaphragm, the diaphragm isolates front and rear cavities of the loudspeaker, the magnetic conductive material is fixed to a surface of the diaphragm, and the diaphragm constitutes a part of the suspension device.

7. The vibration suspension system of claim 6, wherein the magnetic conductive material has a sheet shape and is provided as a plurality of magnetic conductive members, and the plurality of magnetic conductive members are symmetrically provided on both surfaces of the diaphragm.

8. The vibration suspension system of claim 7, wherein, there are one or more sets of magnetic conductive material, and each set of the magnetic conductive material is arranged on the surfaces of the diaphragm.

9. A transducer, comprising the vibration suspension system of claim 1.

10. An electronic device, comprising the vibration suspension system of claim 1.

* * * * *